(12) United States Patent  
Borgen et al.

(10) Patent No.: US 8,494,929 B1  
(45) Date of Patent: Jul. 23, 2013

(54) SALARY ADVISOR FOR SMALL BUSINESS EMPLOYERS

(75) Inventors: Joshua Aaron Borgen, Fremont, CA (US); Todd Matthew Fitch, Santa Clara, CA (US); Miriam Nga-Shun Vu, San Francisco, CA (US)

(73) Assignee: Intuit Inc., Mountain View, CA (US)

( * ) Notice: Subject to any disclaimer, the term of this patent is extended or adjusted under 35 U.S.C. 154(b) by 440 days.

(21) Appl. No.: 12/242,816

(22) Filed: Sep. 30, 2008

Related U.S. Application Data

(63) Continuation-in-part of application No. 12/130,940, filed on May 30, 2008.

(51) Int. Cl.
*G07C 1/10* (2006.01)

(52) U.S. Cl.
USPC .................. 705/32; 705/11; 705/30; 705/31; 705/37; 705/38

(58) Field of Classification Search
None
See application file for complete search history.

(56) References Cited

U.S. PATENT DOCUMENTS

| | | | |
|---|---|---|---|
| 6,430,556 B1 | 8/2002 | Goldberg et al. | |
| 6,820,135 B1 | 11/2004 | Dingman et al. | |
| 6,862,596 B2 * | 3/2005 | Thomsen | 707/10 |
| 7,376,569 B2 * | 5/2008 | Plunkett et al. | 705/1 |
| 7,630,986 B1 | 12/2009 | Herz et al. | |
| 2001/0029482 A1 | 10/2001 | Tealdi et al. | |
| 2001/0047347 A1 * | 11/2001 | Perell et al. | 707/1 |
| 2002/0069081 A1 * | 6/2002 | Ingram et al. | 705/1 |
| 2002/0143752 A1 * | 10/2002 | Plunkett et al. | 707/3 |
| 2002/0198824 A1 * | 12/2002 | Cook | 705/38 |
| 2003/0004748 A1 * | 1/2003 | Coleman et al. | 705/1 |
| 2003/0009418 A1 * | 1/2003 | Green et al. | 705/38 |
| 2003/0212790 A1 * | 11/2003 | Thambidurai et al. | 709/225 |
| 2004/0073539 A1 | 4/2004 | Dettinger et al. | |
| 2006/0026075 A1 | 2/2006 | Dickerson et al. | |
| 2006/0281469 A1 * | 12/2006 | Stoller et al. | 455/456.1 |
| 2007/0094104 A1 * | 4/2007 | Reahard | 705/28 |
| 2007/0106626 A1 | 5/2007 | Mundie et al. | |
| 2007/0112598 A1 * | 5/2007 | Heckerman et al. | 705/2 |
| 2008/0086759 A1 * | 4/2008 | Colson | 726/2 |
| 2008/0170443 A1 | 7/2008 | Jung et al. | |

* cited by examiner

*Primary Examiner* — Fateh Obaid
(74) *Attorney, Agent, or Firm* — Osha Liang LLP

(57) ABSTRACT

The invention relates to a method for providing advice regarding compensation of a candidate. The method involves obtaining a plurality of compensation records from multiple sources, where at least one of the multiple sources is a financial application of a first entity, aggregating the compensation records, receiving a request for a compensation report from a second entity, where the compensation report includes compensation advice, and where the request includes a compensation profile of a candidate including multiple parameters, identifying a subset of the plurality of compensation records matching at least one of the multiple parameters in the compensation profile, generating the compensation report based on the subset of the multiple compensation records and the request, and providing the compensation report for the candidate.

15 Claims, 5 Drawing Sheets

SALARY ADVISOR FOR SMALL BUSINESS EMPLOYERS

CROSS-REFERENCE TO RELATED APPLICATION

This application is a continuation-in-part of and, pursuant to 35 U.S.C. §120, claims benefit to U.S. patent application Ser. No. 12/130,940 entitled "METHOD AND SYSTEM FOR APPLICANT SALARY AND EMPLOYMENT HISTORY VERIFICATION," filed on May 30, 2008, which is hereby incorporated by reference in its entirety and assigned to the assignee of the present application.

BACKGROUND

The job market is an extremely competitive environment, and many employers strive to offer competitive salaries. Most employment and compensation information is considered to be highly private and laws prohibit dissemination of this information without an individual's consent. As a result, this type of information, though valuable to businesses, is generally not aggregated for research purposes.

With advances in computer-related business technology, many businesses now manage their payroll systems using one or more business applications, and maintain electronic employment and payroll records. Despite these advances, it remains a challenge for small business owners to competitively set employee salaries.

SUMMARY

In general, in one aspect, the invention relates to a method for providing advice regarding compensation of a candidate comprising: obtaining a plurality of compensation records from a plurality of sources, wherein at least one of the plurality of sources is a financial application of a first entity; aggregating the compensation records; receiving a request for a compensation report from a second entity, wherein the compensation report comprises compensation advice, and wherein the request comprises a compensation profile of a candidate including a plurality of parameters; identifying a subset of the plurality of compensation records matching at least one of the plurality of parameters in the compensation profile; generating the compensation report based on the subset of the plurality of compensation records and the request; and providing the compensation report for the candidate.

In general, in one aspect, the invention relates to a method for evaluating compensation of a candidate in a labor market comprising: obtaining a compensation profile based on characteristics of the candidate, wherein the compensation profile comprises employment data; submitting a request for a compensation report based on the compensation profile; and receiving a compensation report corresponding to the compensation profile, wherein the compensation report is based on labor market data aggregated from a plurality of data sources comprising a business application.

In general, in one aspect, the invention relates to a system to evaluate candidate compensation in a labor market, comprising: an aggregate data repository configured to store aggregated data, wherein aggregated data comprise employment data from a plurality of data sources comprising a business application and a data processing service. The data processing service configured to: receive a request for a compensation report for a candidate, extract labor market compensation data from the aggregate data repository, wherein compensation data conforms to a compensation profile, evaluate compensation data with respect to compensation profile, and providing the compensation report for the candidate.

In general, in one aspect, the invention relates to a computer readable medium storing instructions for evaluating compensation in a labor market. The instructions comprising functionality to: obtain a plurality of compensation records from a plurality of sources, wherein at least one of the plurality of sources is a financial application of a first entity; aggregate the compensation records; receive a request for a compensation report from a second entity, wherein the compensation report comprises compensation advice, and wherein the request comprises a compensation profile of a candidate including a plurality of parameters; identify a subset of the plurality of compensation records matching at least one of the plurality of parameters in the compensation profile; generate the compensation report based on the subset of the plurality of compensation records and the request; and provide the compensation report for the candidate.

Other aspects and advantages of the invention will be apparent from the following description and the appended claims.

DETAILED DESCRIPTION

Figure 1:
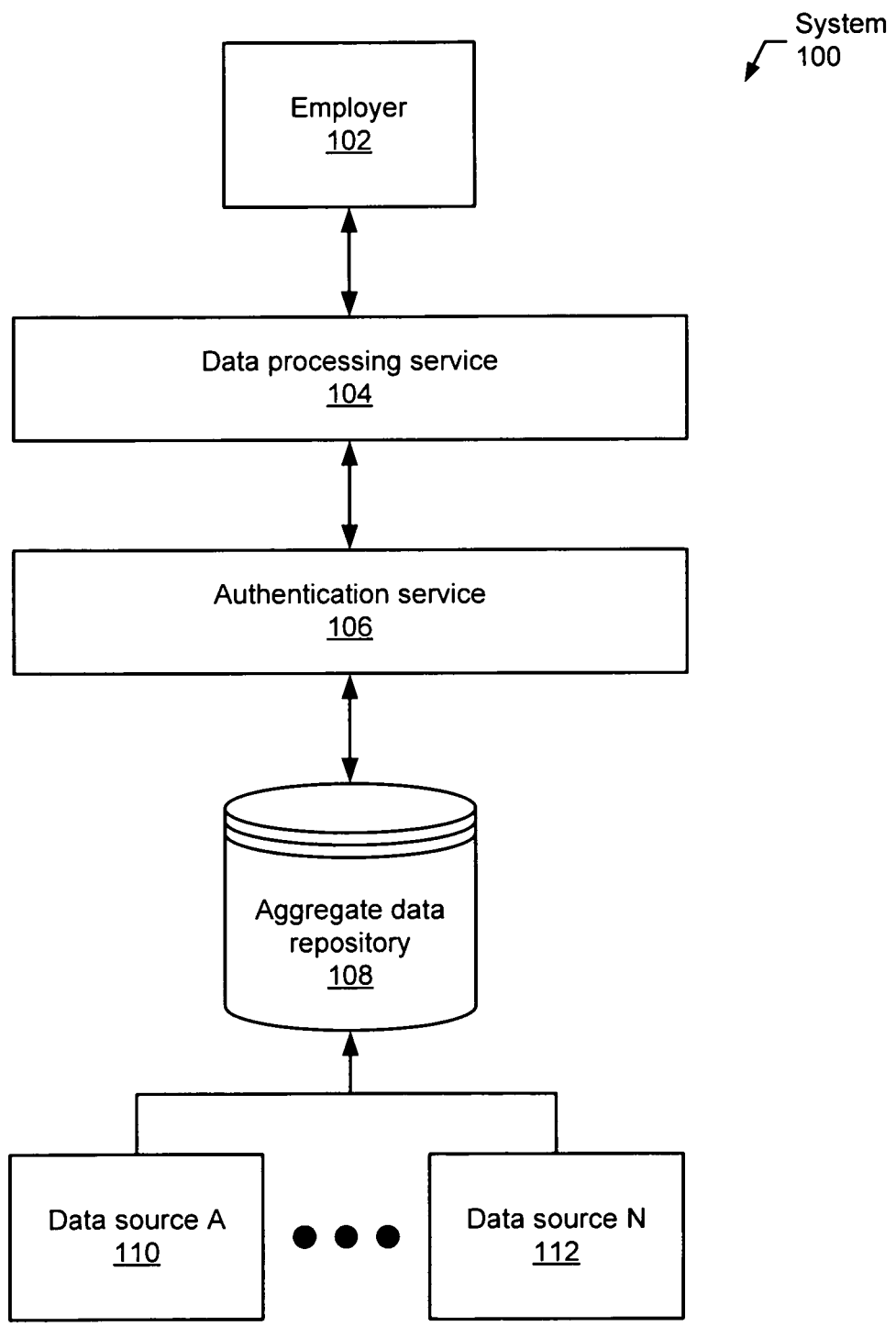
FIGS. 1 and 2 show diagrams of systems in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

In general, embodiments of the invention provide a system and method for providing employee compensation advice to small business owners. The compensation advice is based on employment data. Specifically, in one or more embodiments of the invention, the compensation advice is based on aggregated employment data obtained from a variety of sources. This aggregated data is then compared to employee salaries to provide a compensation report, or used to determine salaries for new employees.

FIG. 1 shows a diagram of a system (100) in accordance with one or more embodiments of the invention. The system (100) includes multiple data sources (e.g., data source A (110) and data source N (112)) configured to provide data to an aggregate data repository (108). The aggregate data repository (108) is referred to as "aggregate" because it is configured to store aggregated data from the data sources. For the purposes of this discussion, "aggregated" means "grouped together." For example, if the aggregate data repository (108) is a database, data from the data sources may be grouped together in one or more tables of the database. Alternatively, aggregated data may be grouped together as cells in a spreadsheet, fields of an extensible markup language (XML) document, or in any other aggregated format. Those skilled in the art will appreciate that data may be stored and aggregated in many different ways.

In one or more embodiments of the invention, the data sources (e.g., data source A (110) and data source N (112)) include one or more business applications. Business applications are software products that provide functionality for managing business operations. For example, the data sources may include one or more financial management applications used to manage payroll and/or paycheck data for a business. Further, data from the data sources may include demographic information about the businesses, such as name, location, industry, number of employees at each location, maturity of the employer, or any other type of demographic information about the businesses. In one or more embodiments of the invention, individuals, businesses, and/or payroll processing companies may upload data to one or more application data repositories associated with the data sources (discussed below).

Further, the data sources may be managed by one or more employers (individuals or companies), research companies, government organizations, educational facilities, and/or financial institutions (such as banks, credit unions, investment banks, etc.), taxing entities (such a state or federal payroll tax agency), etc. In general, the data sources may include any type of source configured to provide employment information. Many different types of payroll, records management, and employment data may be used.

Data sources that may be used include, for example, QuickBooks®, Quicken®, TurboTax®, ProSeries®, the Internal Revenue Service, the Social Security Administration, Internet search engines, or any other type of data source configured to provide employment data. The aforementioned data sources are listed as examples only and should not be construed as limiting the scope of the invention. QuickBooks®, Quicken®, TurboTax®, and ProSeries® are registered trademarks of Intuit, Inc.

As used herein, the terms "employment data" and "compensation profile" include information relevant to determining an individual's compensation, such as years of experience, level of seniority, job title, benefits, bonuses, commissions, industry, location, and/or any other data that may be relevant for determining compensation.

As used herein, the term "compensation report" includes a comparative analysis of employment data and other information provided by an employer, in the form of a compensation profile, and data associated with other similarly situated employees from the aggregated data. For example, the compensation report may contain information regarding average (or suggested) salaries for employees with the same job title in the same city, or other geographic area, as the employer. The comparison may be based on, for example, payroll data submitted by other employers in the area. In one or more embodiments of the invention, the submission of the payroll data results from payroll data gathered from employers using a payroll system to run payroll for the company (i.e., to pay employees) in the ordinary course of business and not by direct submission for the express purpose of being included in a compensation reporting data service. Those skilled in the art will appreciate that the comparison information for the compensation report may be presented in numerous ways without departing from the spirit and/or scope of this invention.

Continuing with discussion of FIG. 1, requests for a compensation report may be made automatically by business software used by an employer (102). For example, the employer (102) may use payroll software to manage his employee payrolls. This software could extract the information needed to form a compensation profile, and then submit the profile to the data processing service (104). Alternatively, the employer could enter the information, and submit the compensation profile manually to the data processing service (104).

In one or more embodiments of the invention, the system (100) includes one or more data processing services (e.g., data processing service (104)). The data processing services are configured to generate matches between the compensation profile and any information stored in the aggregate data repository (108). In one or more embodiments of the invention, near matches may be generated as well, to provide more data points for statistical comparisons. For example, a near match may be two employees with the same job title, location, and industry, but the first has 5 years experience and the second has 8 years experience.

In view of the above, in one or more embodiments of the invention, the data sources may be thought of as input services for the aggregate data repository (108), because the data sources are used to input data to the aggregate data repository (108). Further, in one or more embodiments of the invention, the data processing services may be thought of as output services for the aggregate data repository (108), because the data processing services generate output based on the data in the aggregate data repository (108). Specifically, the data processing services generate output in the form of a compensation report, and may also be configured to generate other types of output based on data from the aggregate data repository (108). In one or more embodiments of the invention, the aggregate data repository (108) is communicatively coupled with application programming interfaces (APIs) (not shown) that allow input services and/or output services to interact with the aggregate data repository (108).

In one or more embodiments of the invention, access to the aggregate data repository (108) is restricted using an authentication service (106). Specifically, the authentication service (106) is configured to ensure that only authorized data processing services are given access to the aggregate data repository (108). For example, the authentication service (106) may require a data processing service to present a username and/or password, an encrypted digital signature, or any other type of authorization credential recognized as valid by the authentication service (106). In one or more embodiments, the aggregate data repository (108) is located in a local area network (LAN) and the authentication service (106) includes a firewall protecting the LAN from unauthorized access.

Figure 2:
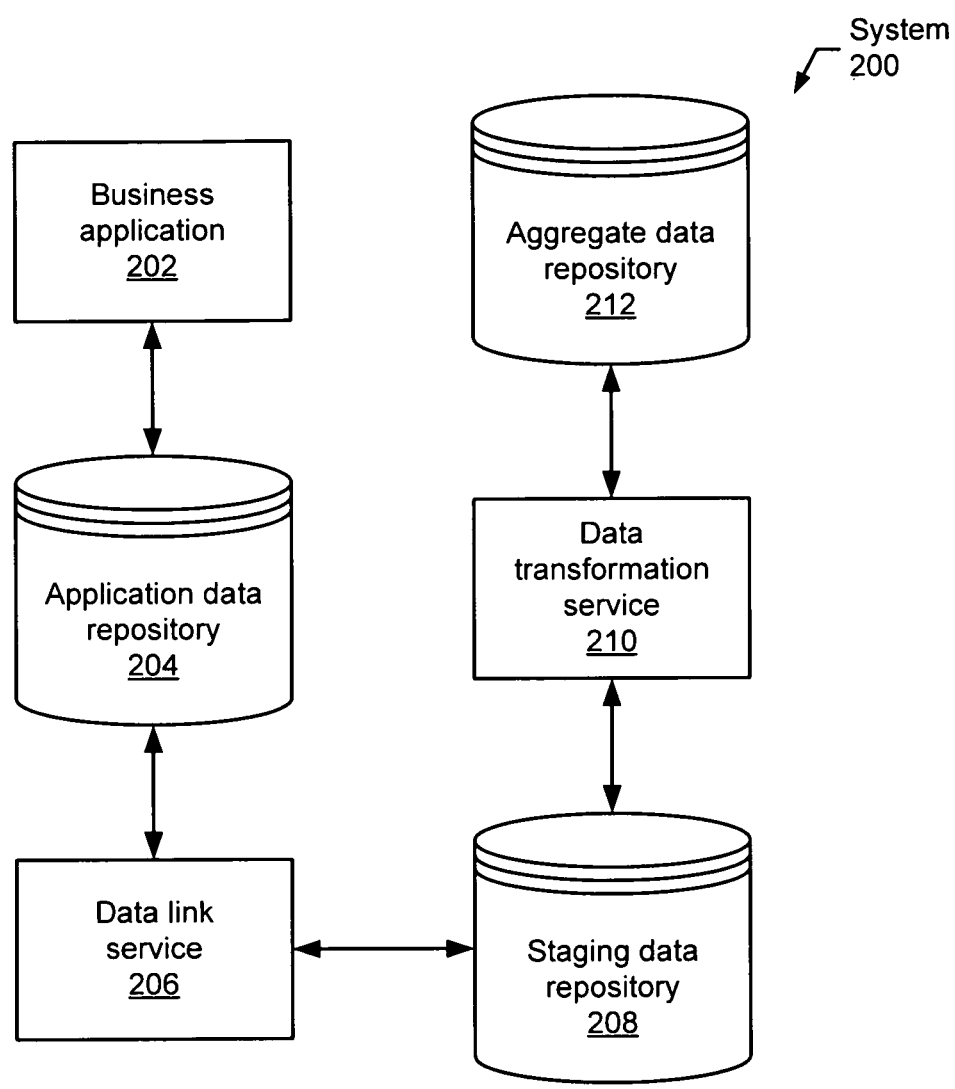

As discussed above, the data sources shown in FIG. 1 may include one or more business applications. FIG. 2 shows a diagram of a system (200) that includes a business application (202) in accordance with one or more embodiments of the invention. The business application (202) may be a financial management application, a payroll application, a research application, a credit analysis application, a search engine, or any other type of business application configured to provide employment data.

In one or more embodiments of the invention, data from the business application (202) are stored in an application data repository (204). The application data repository (204) may be a database, an XML document, a spreadsheet, a text file, or any other type of repository configured to store data associated with the business application (202). Some examples of data that may be stored are described above.

In one or more embodiments of the invention, before data from the application data repository (204) are transmitted to an aggregated data repository (212), the data are transformed to a format compatible with the aggregate data repository (212). For example, if the aggregate data repository (212) is a database, the data may require normalization to conform to a database schema used by the aggregate data repository (212). As another example, the data may require transformation to a particular XML format. Many different types of data transformation may be required, depending on the implementations of the application data repository (204) and the aggregate data repository (212).

In one or more embodiments of the invention, to transform the data to a compatible format, the data are transmitted to a staging data repository (208) using a data link service (206). In one or more embodiments, the data link service (206) is a module or plug-in of the business application (202). Alternatively, the data link service (206) may be independent of the business application (202). In either case, the data link service (206) is configured to retrieve data from the application data repository (204) and transmit the data (for example, over a file system and/or network) to the staging data repository (208).

Further, in one or more embodiments of the invention, the data link service (206) is configured to retrieve only a subset of the data available in the application data repository (204). For example, if the application data repository (204) is configured to store a business's financial data, the data link service (206) may omit data that concerns the business and is unrelated to employees, such as a credit card number, a bank account number, or any other type of private data. Alternatively, private business data may be transmitted to the aggregate data repository (212), and privacy of the data may be enforced by another component of the system (200), such as an authentication service (not shown) communicatively coupled with the aggregate data repository (212).

In one or more embodiments of the invention, once the data are stored in the staging data repository (208), the data are transformed to the required format by a data transformation service (210) and the transformed data are transmitted to the aggregate data repository (212). Data stored in the aggregate data repository (212) may then be used to provide a compensation report, as discussed herein.

While the system (200) shown in FIG. 2 includes several different components, embodiments of the invention may be envisioned that omit one or more of these components. For example, in one or more embodiments, the data link service (206) is configured to transmit data directly to the data transformation service (210). In such cases, use of the staging data repository (208) may not be required. Further, the business application (202) may be configured to generate data in a format that is already compatible with the aggregate data repository (212). In such cases, use of the data transformation service (210) may not be required.

Moreover, the business application (202) may be configured to store data directly in the aggregate data repository (212). For example, the business application (202) may be a web-based application configured to use the aggregate data repository (212) for data storage. In such cases, the application data repository (204) and data link service (206) may not be required. Alternatively, the system (200) may be logically separated into client-side and server-side components. For example, the business application (202), application data repository (204), and/or data link service (206) may be executing on an end-user's computer system, and the staging data repository (208), data transformation service (210), and/or aggregate data repository (212) may be executing on one or more other computer systems separated from the end-user's computer system by a network. One of ordinary skill in the art will recognize that many different embodiments of the system (200) may be envisioned that remain within the scope of the invention.

Figure 3:
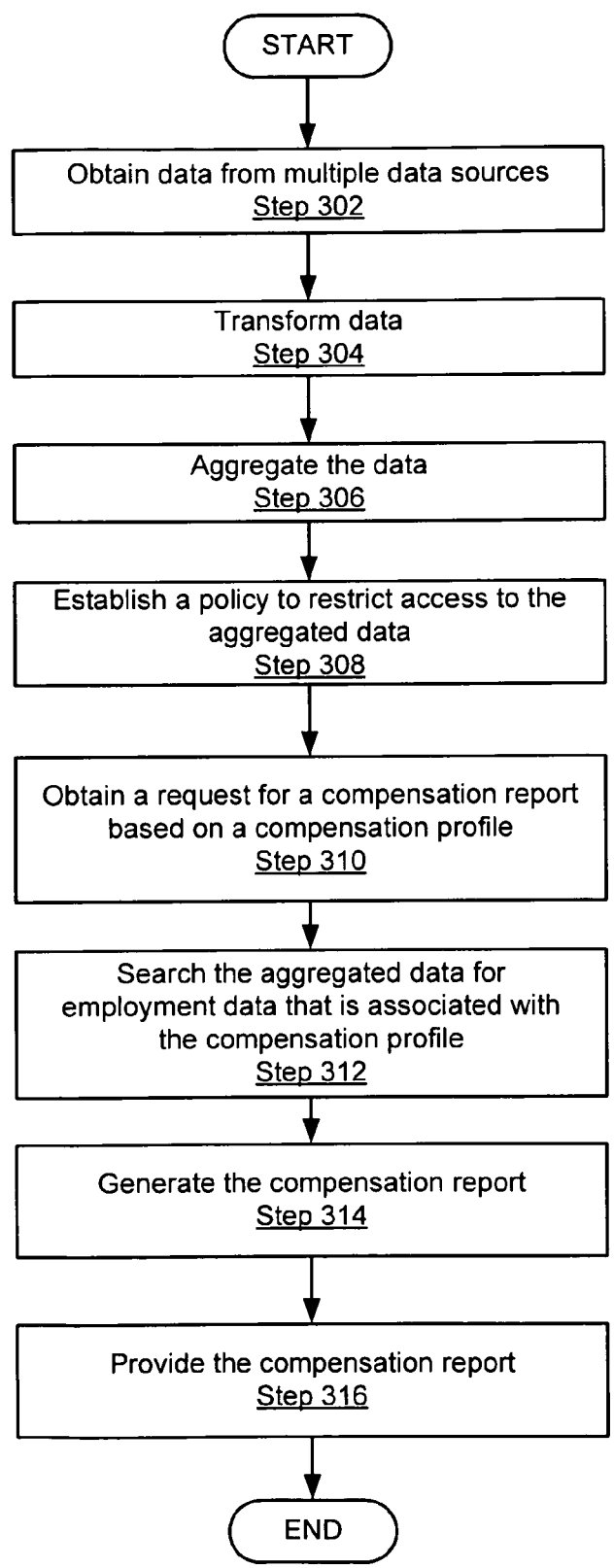
FIG. 3 shows a flowchart of a method in accordance with one or more embodiments of the invention.

FIG. 3 shows a flowchart of a method for providing compensation reports based on aggregated data in accordance with one or more embodiments of the invention. In one or more embodiments of the invention, one or more of the steps shown in FIG. 3 may be omitted, repeated, and/or performed in a different order than the order shown in FIG. 3. Accordingly, embodiments of the invention should not be considered limited to the specific arrangement of steps shown in FIG. 3.

As shown in Step 302, in one or more embodiments of the invention, data are obtained from multiple data sources. As discussed above, the data sources may include one or more business applications, payroll services, and/or financial institutions (such as banks, credit unions, investment banks, etc.), taxing entities (such a state or federal payroll tax agency), etc. In general, the data sources may include any type of source configured to provide employment data. Many different types of employment data may be used. Examples of data that may be provided by the data sources include those described above.

As shown in Step 304, in one or more embodiments of the invention, the data are transformed to a data format that is compatible with an aggregate data repository. For example, as discussed above, the data may be transformed to satisfy a particular database schema or XML format. Further, as discussed above, the data may be transformed using a data transformation service communicatively coupled with the aggregate data repository. In general, in one or more embodiments of the invention, transforming the data allows for data from multiple types of data sources to be aggregated in the aggregate data repository.

As shown in Step 306, in one or more embodiments of the invention, the data are aggregated. As noted above, the term "aggregating" means "grouping together." For example, data may be grouped in one or more tables of the database, cells in a spreadsheet, fields of an XML document, or in any other aggregated format.

As shown in Step 308, in one or more embodiments of the invention, a policy to restrict access to aggregated data is established. Restricting access to the aggregated data may involve ensuring that only authorized entities (for example, businesses, individuals, etc) have access to the aggregated data. For example, access may be restricted by enforcing a username and/or password, an encrypted digital signature, or any other type of authorization credential. Further, access may be restricted based on a location of the aggregate data repository in a network. For example, the aggregate data repository may be located in a local area network (LAN) and access may be restricted using a firewall that protects the LAN from unauthorized access. In one or more embodiments of the invention, restricting access to the aggregated data also involves a type of filtering, by limiting access to a particular subset of the aggregated data.

Further, in one or more embodiments of the invention, a policy restricting access to the aggregated data is based on whether an entity has purchased access to the aggregated data. In other words, the right to access the aggregated data may be sold and non-paying entities may not be allowed to access the aggregated data. For example, an entity may purchase the right to query (using Structured Query Language (SQL), a report interface, or any other appropriate query mechanism) the aggregated data or a subset thereof. In one or more embodiments of the invention, the right to access the aggregated data is sold using a subscription model, where the entity purchases access rights for a limited time period or with recurring fees. One of ordinary skill in the art will recognize that there are other methods with which to restrict access to the aggregated data, and as such, the invention should not be limited to the examples discussed above.

As shown in Step 310, in one or more embodiments of the invention, a request for a compensation report is obtained. For example, an employer may be hiring a new employee, and wants advice regarding what salary to pay the employee. In one or more embodiments of the invention, the request is in the form of a compensation profile, which includes candidate years of experience, level of seniority, job title, benefits, bonuses, commissions, industry, location, and other information relevant to providing compensation advice. In one or more embodiments of the invention, the request is obtained via a web-based user interface.

As shown in Step 312, in one or more embodiments of the invention, the aggregated data are searched for data associated with the compensation profile. In one or more embodiments, the search takes place in the data repository and the data may be filtered or clustered in order to reduce search times. For example, the aggregated data may be clustered based on geographic location (e.g., the same city, state, etc.), or it may be clustered based on industry (e.g., pharmaceuticals, law, health care, etc.) (or a combination of geographic location and industry). Further, near matches may be returned to increase the overall accuracy of the compensation report. For example, if a compensation profile shows that a candidate has 5 years of experience, then matches may be returned in the same industry and location with 3 to 8 years of experience, thereby increasing the number of data points for statistical comparison. Those skilled in the art will appreciate that the search may be conducted in numerous ways without departing from the spirit and/or scope of this invention.

As shown in Step 314, in one or more embodiments of the invention, a compensation report is generated based on the request and the aggregated data. A compensation report includes a comparative and statistical analysis of employment data from the aggregate data repository and data provided by the compensation profile. In one or more embodiments of the invention, this data is analyzed to create a suggested salary range for the candidate. Those skilled in the art will appreciate that the comparative analysis for the employment history verification report may be presented in numerous ways without departing from the spirit and scope of this invention.

As shown in Step 316, the compensation report is then provided to the user (or someone designated by the user). The compensation report may be provided in a variety of formats including, but not limited to, a text document, a spreadsheet, or an email.

In one or more embodiments of the invention, the method described in FIG. 3 may be automatic. For example, an employer may be using a business application to update his or her payroll, or check the accounting figures. While the employer is working, the business application may automatically extract a compensation profile for each employee who has information entered in the application, and submit a request for a compensation report for each employee to the data processing service. When the compensation report comes back for each employee the employer may be notified. Alternatively, the employer may only be notified if the salary he or she is paying their employee is above or below the range suggested by the compensation report. This way an employer could be alerted that they are paying an employee too little, or too much. Further, the business application could be set up to automatically check employee salaries on a regular basis, such as quarterly, annually, or any other time interval. One of ordinary skill in the art will recognize that there are a variety of ways that the method described in FIG. 3 could be automated and thus automation of the invention should not be limited to the example described above.

Figure 4:
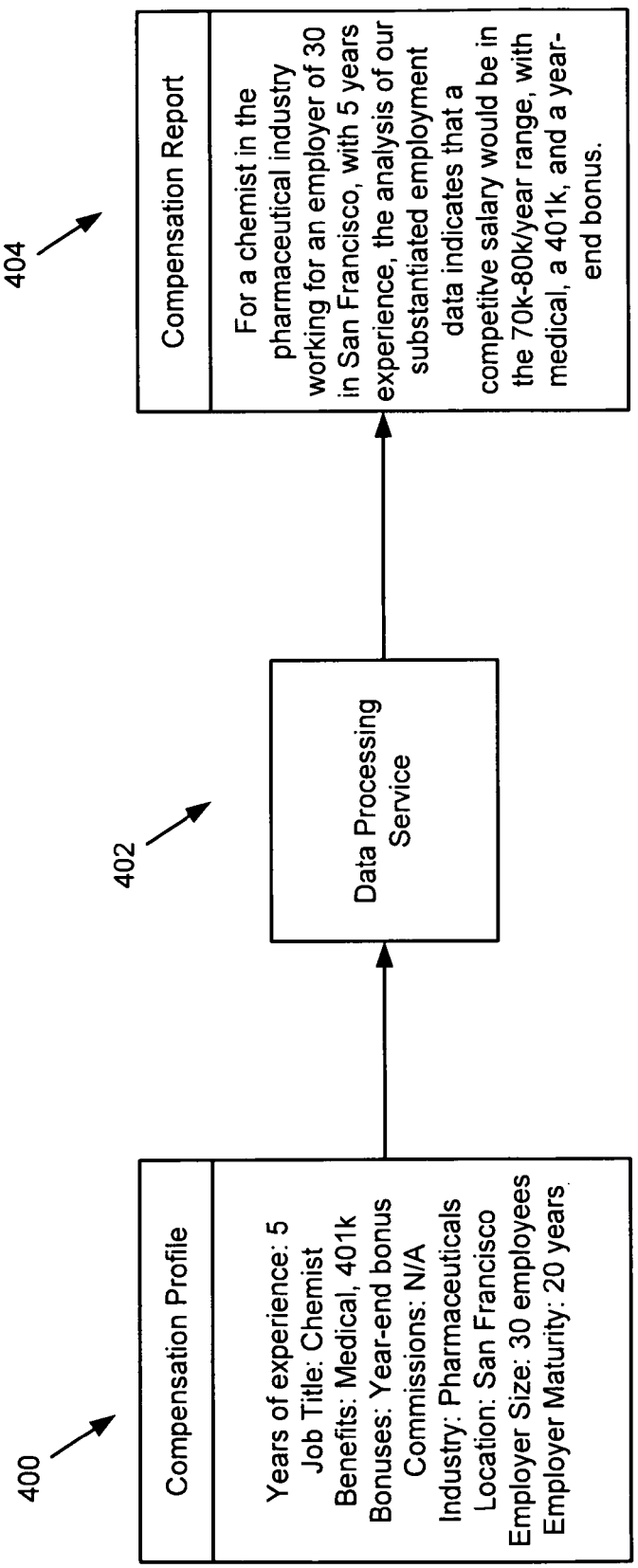
FIG. 4 shows an example in accordance with one or more embodiments of the invention.

FIG. 4 shows a data flow diagram of an example of using the system and performing the method described herein, and is consistent with one or more embodiments of the invention. Initially, an employer enters information in a compensation profile (400) (or, alternatively, the information is extracted from a business application). The particular information entered in this example is for a chemist working in the pharmaceutical industry with 5 years experience. The chemist lives in San Francisco, works for an employer who has been in existence for 20 years. The employer employs 30 people and offers medical coverage, a matching 401k plan, and a year-end bonus as benefits to employees. The employer then submits the information to the data processing service (402). In one or more embodiments of the invention, this submittal process may be automated, as discussed above. Further, in one or more embodiments of the invention, access to the aggregated data through the data processing service (402) may be controlled by a fee or subscription basis, as discussed above.

Once the information is submitted, the compensation profile (400) is compared to the aggregated employment data by the data processing service (402). Once the comparison and corresponding calculations are complete, the data processing service (402) returns a compensation report (404) that provides advice for the employer. In this example, the advice provided is that a competitive salary for the chemist in San Francisco should be in the $70-80,000/year range. In one or more embodiments of the invention, the employer may not have access (or a desire) to view the compensation report. For example, if the profile was submitted automatically, the employer may only see the compensation report if the suggested salary is higher or lower than the current employee(s) are paid.

Figure 5:
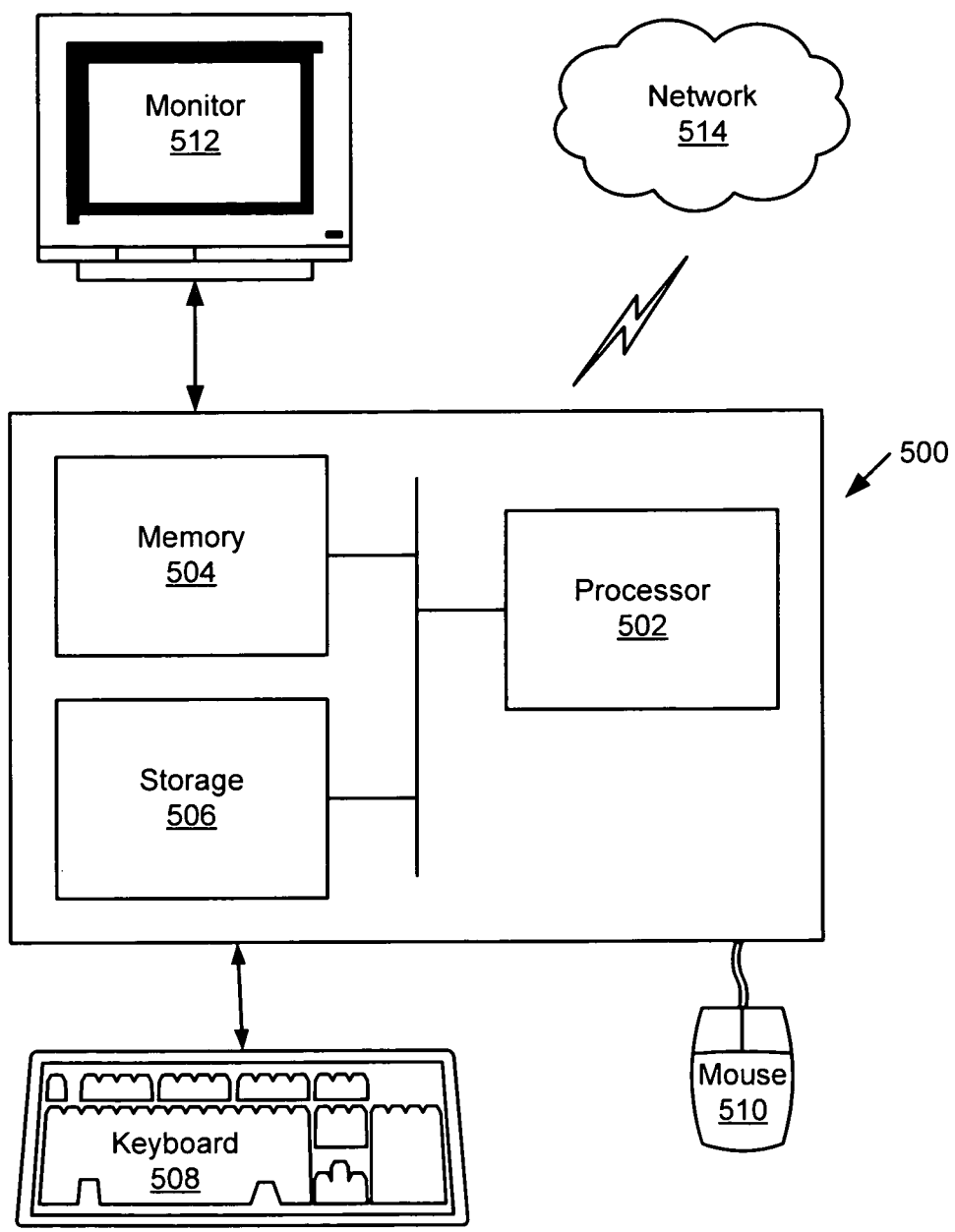
FIG. 5 shows a diagram of a computer system in accordance with one or more embodiments of the invention.

Embodiments of the invention may be implemented on virtually any type of computer regardless of the platform being used. For example, as shown in FIG. 5, a computer system (500) includes one or more processor(s) (502), associated memory (504) (e.g., random access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computer (500) may also include input means, such as a keyboard (508), a mouse (510), or a microphone (not shown). Further, the computer (500) may include output means, such as a monitor (512) (e.g., a liquid crystal display (LCD), a plasma display, or cathode ray tube (CRT) monitor). The computer system (500) may be connected to a network (514) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (500) includes at least the minimal processing, input, and/or output means necessary to practice embodiments of the invention.

Further, those skilled in the art will appreciate that one or more elements of the aforementioned computer system (500)

may be located at a remote location and connected to the other elements over a network. Further, embodiments of the invention may be implemented on a distributed system having a plurality of nodes, where each portion of the invention (e.g., application data storage, aggregation engine, data analysis engine, rules engine, etc.) may be located on a different node within the distributed system. In one or more embodiments of the invention, the node corresponds to a computer system; however, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for providing advice regarding compensation of a candidate comprising:
   obtaining, automatically and from a first data repository, a first compensation record generated by a first payroll application used by a first entity to run a first payroll, wherein the first compensation record comprises a first industry, a first job title, a first length of professional experience, a first wage, a first tax amount reported to a first taxing entity, and a first data reported to a first third-party auditor;
   obtaining, automatically and from a second data repository, a second compensation record generated by a second payroll application used by a second entity to run a second payroll, wherein the second compensation record comprises a second industry, a second job title, a second length of professional experience, a second wage, a second tax amount reported to a second taxing entity, and a second data reported to a second third-party auditor;
   obtaining, automatically and from a taxing entity data source, a third compensation record;
   obtaining, automatically and from a third-party audited employer compensation data source, a fourth compensation record;
   aggregating, by a data processing service executing on a processor, the first compensation record, the second compensation record, the third compensation record, and the fourth compensation record to generate an aggregate compensation data;
   receiving, from a third entity, a request for a compensation report and a compensation profile of a candidate comprising an industry of the candidate, a job title of the candidate, and a length of professional experience of the candidate;
   searching, in response to the request and using the industry, the job title, and the length of professional experience, the aggregate compensation data to identify a match between the first compensation record and the compensation profile of the candidate, wherein the industry equals the first industry and the job title equals the first job title;
   generating, in response to identifying the match, the compensation report comprising the industry, the job title, the length of professional experience, and the first wage; and
   providing the compensation report for the candidate to the third entity.

2. The method of claim 1, further comprising:
   searching a third-party database for information associated with the request.

3. The method of claim 1, further comprising:
   establishing a policy to restrict access to the aggregate compensation data and the compensation report.

4. The method of claim 1, wherein the compensation profile comprises a level of seniority of the candidate, a plurality of benefits, a plurality of bonuses, a plurality of commissions, a number of employees employed by an employer, and a geographic location of the employer.

5. The method of claim 1, wherein a labor market comprises a number of employees employed by an employer, a geographic location of the employer and the industry.

6. The method of claim 1, wherein the compensation report further comprises a comparative analysis of information contained in the compensation profile and the aggregate compensation data.

7. The method of claim 6, wherein the comparative analysis comprises a statistical distribution of the aggregate compensation data.

8. The method of claim 1, wherein the compensation report further comprises a subscription to access the aggregate compensation data.

9. A system for providing advice regarding compensation of a candidate, comprising:
   a data processing service configured to:
   obtain, automatically and from a first data repository, a first compensation record generated by a first payroll application used by a first entity to run a first payroll, wherein the first compensation record comprises a first industry, a first job title, a first length of professional experience, a first wage, a first tax amount reported to a first taxing entity, and a first data reported to a first third-party auditor;
   obtain, automatically and from a second data repository, a second compensation record generated by a second payroll application used by a second entity to run a second payroll, wherein the second compensation record comprises a second industry, a second job title, a second length of professional experience, a second wage second tax amount reported to a second taxing entity, and a second data reported to a second third-party auditor;
   obtain, automatically and from a taxing entity data source, a third compensation record;
   obtain, automatically and from a third-party audited employer compensation data source, a fourth compensation record;
   aggregate the first compensation record, the second compensation, the third compensation record, and the fourth compensation record to generate an aggregate compensation data;
   receive, from a third entity, a request for a compensation report and a compensation profile of a candidate comprising an industry of the candidate, a job title of the candidate, and a length of professional experience of the candidate;
   search, in response to the request and using the industry, the job title, and the length of professional experience, the aggregate compensation data to identify a match between the first compensation record and the compensation profile of the candidate, wherein the industry equals the first industry and the job title equals the first job title;

generate, in response to identifying a match, the compensation report comprising the industry, the job title, the length of professional experience, and the first wage; and provide the compensation report for the candidate to the third entity.

10. The system of claim 9, wherein the compensation report further comprises a comparative analysis of the information contained in the compensation profile and employment data associated with a labor market.

11. The system of claim 9, further comprising:
an authentication service configured to restrict access to the aggregate compensation data and the compensation report.

12. The system of claim 9, further comprising:
a web-based user interface, operatively connected to the data processing service, wherein the request and the compensation report are provided using the web-based user interface.

13. The system of claim 12, wherein providing the compensation report comprises providing a subscription to access the aggregate compensation data.

14. A non-transitory computer readable storage medium storing instructions for providing advice regarding compensation of a candidate, the instructions executable on a processor and comprising functionality to:

obtain, automatically and from a first data repository, a first compensation record generated by a first payroll application used by a first entity to run a first payroll, wherein the first compensation record comprises a first industry, a first job title, a first length of professional experience, a first wage, a first tax amount reported to a first taxing entity, and a first data reported to a first third-party auditor;

obtain, automatically and from a second data repository, a second compensation record generated by a second payroll application used by a second entity to run a second payroll, wherein the second compensation record comprises a second industry, a second job title, a second length of professional experience, a second wage, a second tax amount reported to a second taxing entity, and a second data reported to a second third-party auditor;

obtain, automatically and from a taxing entity data source, a third compensation record;

obtain, automatically and from a third-party audited employer compensation data source, a fourth compensation record;

aggregate the first compensation record, the second compensation record, the third compensation record, and the fourth compensation record to generate an aggregate compensation data;

receive, from a third entity, a request for a compensation report and a compensation profile of a candidate comprising an industry of the candidate, a job title of the candidate, and a length of professional experience of the candidate;

search, in response to the request and using the industry, the job title, and the length of professional experience, the aggregate compensation data to identify a match between the first compensation record and the compensation profile of the candidate, wherein the industry equals the first industry and the job title equals the first job title;

generate, in response to identifying the match, the compensation report comprising the industry, the job title, the length of professional experience, and the first wage; and provide the compensation report for the candidate to the third entity.

15. The non-transitory computer readable storage medium of claim 14, wherein the compensation report further comprises a comparative analysis of information contained in the compensation profile and employment data associated with the labor market.

\* \* \* \* \*